United States Patent
Ushijima et al.

(10) Patent No.: US 10,515,071 B2
(45) Date of Patent: Dec. 24, 2019

(54) DATABASE MANAGEMENT SYSTEM AND DATABASE MANAGEMENT METHOD USING LOGICAL ADDRESSES AND TIMESTAMPS

(71) Applicant: Hitachi, Ltd., Tokyo (JP)

(72) Inventors: Kazutomo Ushijima, Tokyo (JP); Akira Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 128 days.

(21) Appl. No.: 15/564,514

(22) PCT Filed: Apr. 8, 2015

(86) PCT No.: PCT/JP2015/061007
§ 371 (c)(1),
(2) Date: Oct. 5, 2017

(87) PCT Pub. No.: WO2016/162981
PCT Pub. Date: Oct. 13, 2016

(65) Prior Publication Data
US 2018/0081928 A1    Mar. 22, 2018

(51) Int. Cl.
*G06F 16/23*    (2019.01)
*G06F 16/22*    (2019.01)
(Continued)

(52) U.S. Cl.
CPC .......... *G06F 16/2365* (2019.01); *G06F 3/067* (2013.01); *G06F 3/0608* (2013.01);
(Continued)

(58) Field of Classification Search
CPC ............. G06F 16/2365; G06F 16/2282; G06F 16/2455; G06F 3/0608; G06F 3/0652;
(Continued)

(56) References Cited

U.S. PATENT DOCUMENTS

| 2009/0055578 A1* | 2/2009 | Lee ............... G06F 12/0246 711/103 |
| 2012/0198130 A1* | 8/2012 | Noborikawa ........ G06F 3/0616 711/103 |
| 2015/0363425 A1* | 12/2015 | Li ................. G06F 12/0246 707/690 |

FOREIGN PATENT DOCUMENTS

WO    2012/104909 A1    8/2012

OTHER PUBLICATIONS

International Search Report of PCT/JP2015/061007 dated May 26, 2015.

* cited by examiner

*Primary Examiner* — Tracy A Warren
(74) *Attorney, Agent, or Firm* — Mattingly & Malur, PC

(57) ABSTRACT

A blockwise-erase nonvolatile storage device for storing a database includes extended logical-to-physical conversion information that associates, for each of a plurality of logical addresses, a timestamp, a physical address, and a reference counter with each other. Each reference counter indicates the number of referring sources to refer to data associated with both the logical address and the timestamp that are associated with the reference counter. On the basis of the conversion information, it is determined whether a target logical address has associated therewith a timestamp older than the latest timestamp and whether the reference counter associated with both the target logical address and the older timestamp indicates that there is no referring source. If so, then the blockwise-erase nonvolatile storage device manages, as an erasable physical area (invalid physical area), the physical area at the physical address associated with both the target logical address and the older timestamp.

11 Claims, 11 Drawing Sheets

(51) Int. Cl.
*G06F 16/2455* (2019.01)
*G06F 3/06* (2006.01)
*G06F 12/10* (2016.01)

(52) U.S. Cl.
CPC ............ *G06F 3/0652* (2013.01); *G06F 12/10* (2013.01); *G06F 16/2282* (2019.01); *G06F 16/2455* (2019.01); *G06F 2212/2022* (2013.01); *G06F 2212/7201* (2013.01)

(58) Field of Classification Search
CPC .. G06F 3/067; G06F 12/10; G06F 2212/2022; G06F 2212/72; G06F 17/30339; G06F 17/30371; G06F 17/30477
See application file for complete search history.

Extended logical-to-physical conversion information
451

| LA+TS | PA | Reference counter |
|---|---|---|
| LA0+TS0 | PA03 | 0 |
| LA2+TS0 | PA12 | 1 |
| LA2+TS3 | PA21 | 2 |
| LA1+TS1 | PA35 | 0 |
| LA2+TS1 | PA24 | 0 |
| LA0+TS2 | PA54 | 0 |
| .... | .... | .... |

DATABASE MANAGEMENT SYSTEM AND DATABASE MANAGEMENT METHOD USING LOGICAL ADDRESSES AND TIMESTAMPS

TECHNICAL FIELD

The present invention generally relates to database management technology.

BACKGROUND ART

In regards to database management, for example, big data processing is known. In big data processing, both an update process and an analyzing process are desirably carried out. Specifically, for example, capture of a large amount of petty settlement data via smart phones and instant analysis of the large amount of captured settlement data are desired. In addition, for example, capture of a large amount of sensor data and instant analysis of the large amount of captured sensor data are desired.

As database consistency control systems for carrying out both an update process and an analyzing process of such large amounts of data, MVCC (MultiVersion Concurrency Control) systems and, in particular, append-type MVCC systems, are known. According to a append-type MVCC system, when data in a database is updated, a new free area that differs from an area storing data prior to the update is reserved and the data after the update is written into the reserved free area. Data of an old version that is never referred to may be deleted.

In this manner, with the append-type MVCC system, a database management system (hereinafter, DBMS) must perform both version management and free area management. In other words, when the DBMS rewrites data in an area to which a certain logical address (for example, a logical address of a logical space (for example, a logical volume) recognized by the DBMS) belongs in a certain version, the DBMS finds a free area and issues a write request specifying a logical address belonging to the found free area. Therefore, a load of a processor executing the DBMS is high. For example, in free area management, processes such as acquisition and releasing a lock of a free area are required. When such processes occur, processing becomes queued as appropriate in a serializing process (for example, a sequential write).

Meanwhile, storage devices that may be adopted as a storage destination of a database include a so-called blockwise-erase storage device (a storage device which writes post-update data in an area different from an area storing pre-update data) such as a storage device (hereinafter, an FM device) having a NAND flash memory (NAND-FM). With an FM device, data is erased in block units and input and output in page units. Generally, an FM device has a wear leveling function for extending a write-in life of an FM. According to the wear leveling function, valid data stored in one or more blocks with a relatively large number of erasures (number of writes) is copied to one block with a relatively small number of erasures and an erase process is performed on each of the one or more copy source blocks.

As a method of reducing a processor load in append-type MVCC, a method of offloading at least a portion of processes by a DBMS to an FM device is conceivable. However, such a method is not known. Moreover, a technique according to PTL 1 is known as a technique for reducing a processor load for snapshot management. According to PTL 1, at least a portion of snapshot management is offloaded to an FM package. Specifically, the FM package (FM device) manages generation numbers of snapshots. A storage controller receives a read request specifying a generation number from a host apparatus and transmits a snapshot acquisition request specifying the generation number to the FM device.

CITATION LIST

Patent Literature

[PTL 1]
WO 2012/104909

SUMMARY OF INVENTION

Technical Problem

With offloading of snapshot management, as long as a generation number is associated with a page storing snapshot data (data constituting a snapshot image), data in the page can be managed as snapshot data.

However, even when using a technique for offloading at least a portion of snapshot management to an FM device, at least one of version management and free area management in accordance with the append-type MVCC system cannot be offloaded to an FM device. The reason for this is as follows.

Generally, a snapshot is an example of a backup, and data stored as a snapshot has to be preserved until an explicit delete request is made. On the other hand, with append-type MVCC, data of an old version may no longer be referred to after a data update and data that is no longer referred to may be deleted. Simply applying the technique of offloading snapshot management does not enable data which is no longer referred to and which can be deleted to be identified without an explicit instruction such as a delete instruction.

In addition, with databases, there are also database-specific processes such as a commit process and an abort process.

Moreover, the problem described above may occur even if a nonvolatile storage device other than an FM device is adopted as a blockwise-erase nonvolatile storage device.

Solution to Problem

A host system including a database management system is configured to, when an update of data in a database occurs between a start and an end of a transaction, transmit a write request specifying a same logical address as a logical address belonging to an area, in which pre-update data is stored, and a timestamp to a blockwise-erase nonvolatile storage device. The blockwise-erase nonvolatile storage device includes extended logical-to-physical conversion information, which is address conversion information that associates, for each logical address, a timestamp, a physical address, and a reference counter with each other. Each reference counter indicates the number of referring sources to refer to data associated with both the logical address and the timestamp that are associated with the reference counter. The blockwise-erase nonvolatile storage device is configured to manage as a nonerasable physical area (valid physical area) a physical area at a physical address newly allocated to a logical address. On the basis of the extended logical-to-physical conversion information, the blockwise-erase nonvolatile storage device determines whether a target logical address has associated therewith a timestamp older than a latest timestamp, and if so, determines whether the reference counter associated with both the target logical address and the older timestamp indicates that there is no referring source. If this determination is affirmative, then the blockwise-erase nonvolatile storage device manages, as an erasable physical area (invalid physical area), the physical area at the physical address associated with both the target logical address and the older timestamp. Moreover, a "blockwise-erase nonvolatile storage device" is a nonvolatile storage device configured to, when a write request specifying a logical address with which a physical area storing data is associated is received from a host system, write data in accordance with the write request into a free physical area and allocate a physical address of the free physical area to the specified logical address. In other words, a blockwise-erase nonvolatile storage device is a nonvolatile storage device incapable of immediate overwriting data in a same physical area.

Advantageous Effects of Invention

At least one of version management and free area management in accordance with a append-type MVCC system can be offloaded to a blockwise-erase storage device such as an FM device.

DESCRIPTION OF EMBODIMENTS

Hereinafter, several embodiments will be described with reference to the drawings. Moreover, while a "program" is sometimes used as a subject when describing a process in the following description, since a program causes a prescribed process to be performed by appropriately using a storage unit (such as a memory) and/or an interface device (such as a communication port) and the like when being executed by a processor (such as a CPU (Central Processing Unit)), a "processor" may be used instead as a subject of a process. A process described using a program as a subject may be considered a process performed by a processor or by an apparatus or a system including a processor. Furthermore, a processor may include a hardware circuit which performs a part of or all of processes. A program may be installed in an apparatus such as a computer from a program source. The program source may be, for example, a program distribution server or a storage medium that can be read by a computer. When the program source is a program distribution server, the program distribution server may include a processor (for example, a CPU) and a storage unit (for example, a memory), and the storage unit may further store a distribution program and a program that is a distribution target. Furthermore, by having the processor of the program distribution server execute the distribution program, the processor of the program distribution server may distribute the program that is the distribution target to other computers. In addition, in the following description, two or more programs may be realized as one program or one program may be realized as two or more programs.

First Embodiment

Figure 1:
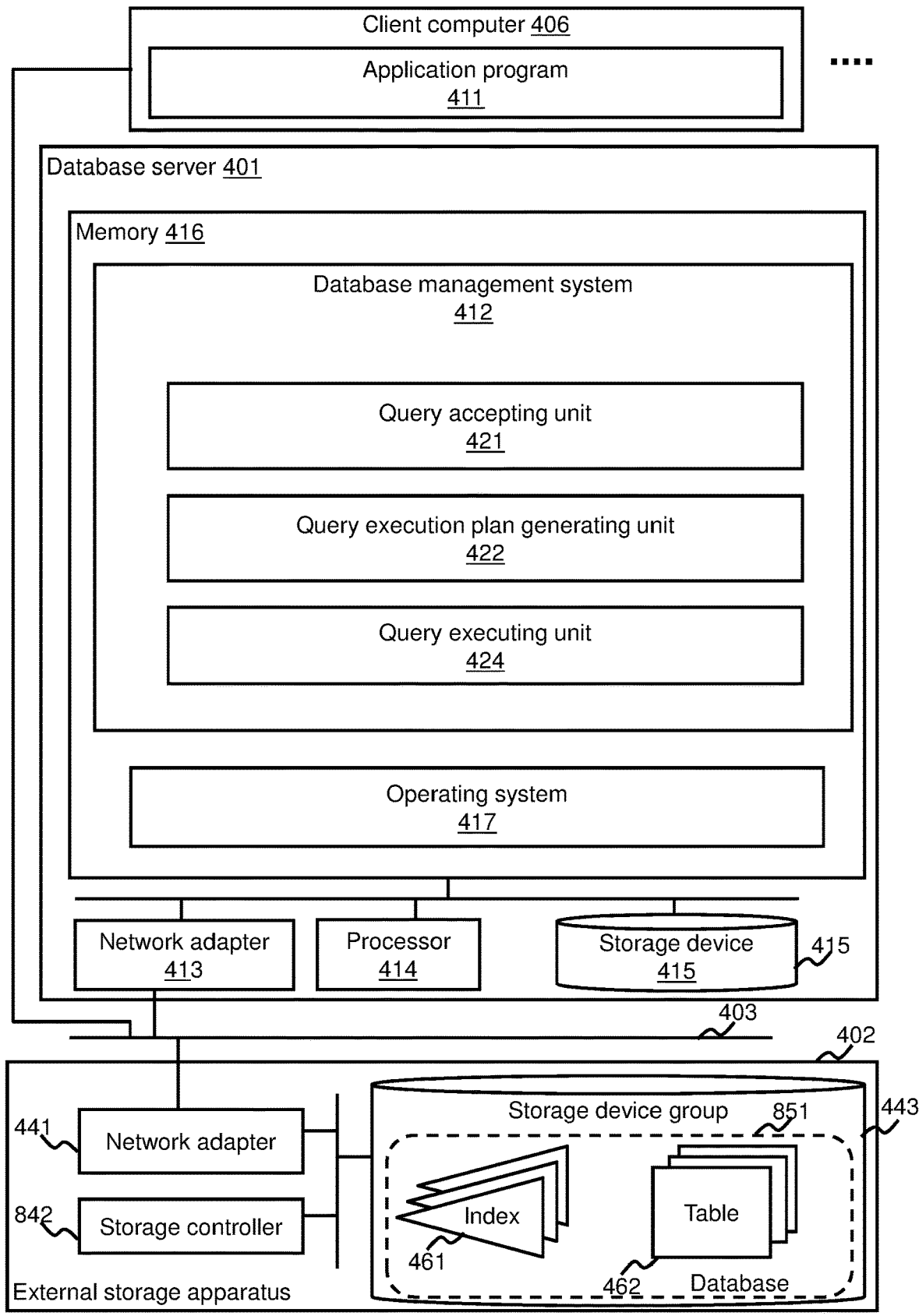
FIG. 1 shows a configuration of a computer system according to a first embodiment.

FIG. 1 shows a configuration of a computer system according to a first embodiment.

A database server 401 is a computer which, for example, may be a personal computer, a work station, or a main frame, or may be a virtual computer constituted by a virtualization program in any of these computers. The database server 401 includes a network adapter 413, a memory 416, a storage device 415, and a processor 414 coupled to these components. The processor 414 is, for example, a microprocessor and executes a computer program. The computer programs executed by the processor 414 are, for example, an operating system 417 and a DBMS 412. The memory 416 is, for example, a volatile DRAM (Dynamic Random-Access Memory) and temporarily stores a program to be executed by the processor 414 and data used by the program. The storage device 415 is, for example, a nonvolatile magnetic disk or a flash memory and stores a program and data used by the program. The network adapter 413 couples a communication network 403 and the database server 401 with each other. The database server 401 communicates with an external storage apparatus 402 and a client computer 406 through the network adapter 413. An application program 411 is executed by the client computer 406. The client computer 406 issues a query to the DBMS 412. The application program 411 may be executed by the database server 401 instead of the client computer 406. The processor 414 may include a dedicated hardware circuit such as a circuit for performing encryption and decryption of data.

In order to improve performance and increase redundancy, the database server 401 may include at least one component of the processor 414, the memory 416, the storage device 415, and the network adapter 413 in plurality. The database server 401 may include an input device (not shown) such as a keyboard or a pointing device and an output device (not shown) such as a liquid crystal display. The input device and the output device may be coupled to the processor 414. The input device and the output device may be integrated with each other.

In the database server 401, when the DBMS 412 executes a query issued from the application program 411, in order to read data from a database 851 or write data into the database 851 in executing the query, the DBMS 412 issues an I/O (Input/Output) request with respect to the external storage apparatus 402 storing the database 851 to the operating system 417. The operating system 417 accepts the I/O request and issues an I/O request to the external storage apparatus 402.

While the external storage apparatus 402 is an apparatus having a storage device group 443 including a plurality of blockwise-erase storage devices and is, for example, a disk array apparatus, alternatively, the external storage apparatus 402 may be a single blockwise-erase storage device. While the external storage apparatus 402 stores the database 851 managed by the DBMS 412 included in the database server 401, the external storage apparatus 402 may store a program in addition to data contained in the database 851. The external storage apparatus 402 accepts an I/O request from the database server 401, writes or reads data in accordance with the I/O request, and returns a result thereof to the database server 401.

In addition to the storage device group 443, the external storage apparatus 402 includes a network adapter 441 and a storage controller 842 coupled to these components.

The network adapter 441 couples the external storage apparatus 402 to the communication network 403 and, consequently, the external storage apparatus 402 is coupled to the database server 401 via the communication network 403. As a communication protocol via the communication network 403, for example, Fibre Channel (FC), SCSI (Small Computer System Interface), PCIe (PCI-Express), or TCP/IP (Transmission Control Protocol/Internet Protocol) may be adopted. For example, when Fibre Channel or SCSI is adopted, the network adapter 413 of the database server 401 and the network adapter 441 of the external storage apparatus 402 may be referred to as host bus adapters.

The blockwise-erase storage devices included in the storage device group 443 are FM devices. The storage device group 443 may have a RAID (Redundant Array of Independent Disks) mechanism and may store data at a prescribed RAID level. The database server 401 may be provided with a logical storage device (for example, a logical unit, a logical volume, or a file system volume) based on a storage space of the storage device group 443, and the database 851 may be stored on the logical storage device.

The storage controller 842 includes, for example, a memory and a processor, and reads data from or writes data to the storage device group 443 storing the database 851 in accordance with an I/O request from the database server 401. For example, when the storage controller 842 accepts a data read request from the database server 401, the storage controller 842 reads data from the storage device group 443 in accordance with the request and returns the read data to the database server 401.

In order to improve performance and increase redundancy, the external storage apparatus 402 may include components such as the storage controller 842 in plurality.

The DBMS 412 manages the database 851. The database 851 includes one or more tables 462 and may further include one or more indices 461. The table 462 is a set of one or more records, and a record is constituted by one or more columns. The index 461 is a data structure created with one or more columns in the table 462 as a target and is intended to speed up access to the table 462 using selection conditions including a column targeted by the index 461 or the like. For example, the table 462 is a data structure that retains, for each value of a target column, information for identifying a record including the value in the table 462. As the data structure, for example, a B-tree is used. A physical address, a logical row ID, and the like may be used as information for identifying a record.

The DBMS 412 includes a query accepting unit 421, a query execution plan generating unit 422, and a query executing unit 424.

The query accepting unit 421 accepts a query issued by the application program 411. The query is described in, for example, Structured Query Language (SQL).

From the query accepted by the query accepting unit 421, the query execution plan generating unit 422 generates a query execution plan including one or more database operations necessary for executing the query. The query execution plan is, for example, information including one or more database operations and a relationship between execution orders of the database operations, and is stored in query execution plan information 423. The query execution plan may be expressed by a tree structure having a database operation as a node and a relationship between execution orders of database operations as an edge.

In accordance with the query execution plan generated by the query execution plan generating unit 422, the query executing unit 424 executes the query accepted by the query accepting unit 421 and returns an execution result to the application program 411. In this case, the query executing unit 424 may issue an I/O request (a write request or a read request) of data necessary to execute a database operation. The issued I/O request is transmitted to the external storage apparatus 402 via the operating system 417.

The configuration of the DBMS 412 shown in FIG. 1 is merely an example. For example, a certain component may be divided into a plurality of components and a plurality of components may be integrated into a single component.

In addition, in the present embodiment, one or more FM (flash memory) devices are adopted as an example of the one or more blockwise-erase storage devices storing a database.

Figure 2:
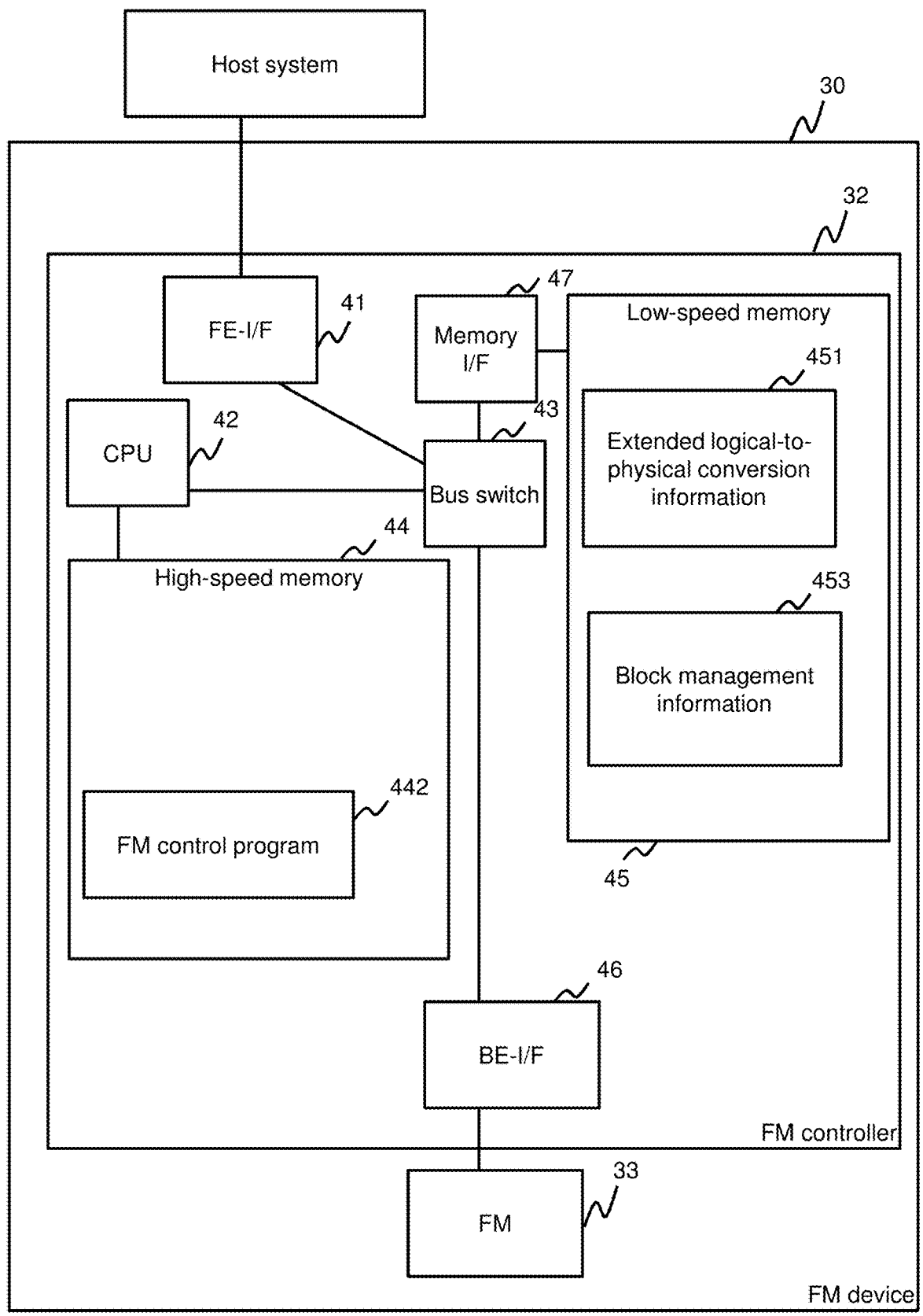
FIG. 2 shows a configuration example of an FM device.

FIG. 2 shows a configuration example of an FM device.

One FM device 30 stores at least a part of the database 851. The FM device 30 includes an FM 33 and an FM controller 32 coupled to the FM 33. The FM controller 32 transmits an I/O request to the FM 33 in accordance with an I/O request from the storage controller 842. A system including the processor 414 executing the DBMS 412 and the storage controller is an example of a host system of the FM device 30. The host system may be a system including one of, but not including the other of, the processor 414 executing the DBMS 412 and the storage controller 842.

The FM 33 is, for example, a NAND-FM and includes one or more FM chips. An FM chip includes a plurality of blocks. Each of the plurality of blocks includes a plurality of pages. Data is input and output in page units and data is erased in block units. The FM 33 is a so-called blockwise-erase memory and does not allow data to be overwritten to a page. Post-update data of data written in a page is to be written into a different free page. In each block, a write destination of data sequentially shifts from a top free page to an end free page. A block with a free page at an end thereof is a so-called block being written (an open block). In addition to free pages, pages include valid pages and invalid pages. The valid page is a page storing valid data and the invalid page is a page storing invalid data but not storing valid data. Valid data refers to latest data with respect to an associated logical address. Invalid data refers to old data (pre-update data) that has been updated by valid data.

The FM controller 32 includes a processor 42, an FE-I/F (frontend interface device) 41, a bus switch 43, a memory I/F 47, a low-speed memory 45, a high-speed memory 44, and a BE-I/F (backend interface device) 46.

The FE-I/F 41 is an interface device which is coupled to the storage controller 842 and which mediates data communication between the storage controller 842 and parts on a side of the bus switch 43.

The bus switch 43 is coupled to the processor 42, the FE-I/F 41, the memory I/F 47, and the BE-I/F 46, and relays data among these parts.

The memory I/F 47 is an interface device which is coupled to the low-speed memory 45 and which controls input and output of data to and from the low-speed memory 45.

The low-speed memory 45 is, for example, a DRAM (Dynamic Random Access Memory) or a nonvolatile memory and stores data and the like to be used in processes performed by the processor 42. The low-speed memory 45 stores extended logical-to-physical conversion information 451 and block management information 453.

The extended logical-to-physical conversion information 451 is information that is an extension of address conversion information representing an association between a logical address and a physical address of the FM device 30. Specifically, the extended logical-to-physical conversion information 451 includes a TS (time stamp) and a reference counter in addition to a logical address and a physical address. Details will be provided later.

The block management information 453 includes, for each block of the FM 33, information related to the block such as a block number, a write start time point (a time point at which data is written to a top page), a write end time point (a time point at which data is written to an end page), a block state (free, bad, or the like), and the number of erasures.

The high-speed memory 44 is, for example, an SRAM (Static Random Access Memory) and is directly coupled to the processor 42. The high-speed memory 44 stores a program to be executed by the processor 42 and the like. In the present embodiment, the high-speed memory 44 stores a flash memory control program (hereinafter, an FM control program) 442. The FM control program 442 inputs or outputs data with respect to the FM 33 in response to an I/O request from the storage controller 842, migrates data between blocks, and the like.

The BE-I/F 46 is an interface device which is coupled to the FM 33 and which controls input and output of data to and from the FM 33.

The configuration of the FM device 30 is not limited to the configuration shown in FIG. 2. For example, instead of a plurality of memories with different performances such as the high-speed memory 44 and the low-speed memory 45, one or more memories with a same performance may be adopted.

As described above, in the present embodiment, one or more FM devices are adopted as an example of the one or more blockwise-erase storage devices storing the database. While the FM device is included in the external storage apparatus 402, the FM device may be included in the database server 401 instead of the external storage apparatus 402. For example, the storage device 415 may be one or more FM devices which store the database. In addition, as a storage medium included in the blockwise-erase storage device besides a NAND-FM, other types of storage media such as a PRAM (Phase Change Random Access Memory), an MRAM (Magnetoresistive Random Access Memory), a ReRAM (Resistance Random Access Memory), and a FeRAM (Ferroelectric Random Access Memory) may be adopted.

In the present embodiment, data is written from the database server 401 to the external storage apparatus 402 in accordance with the append-type MVCC system.

Figure 3:
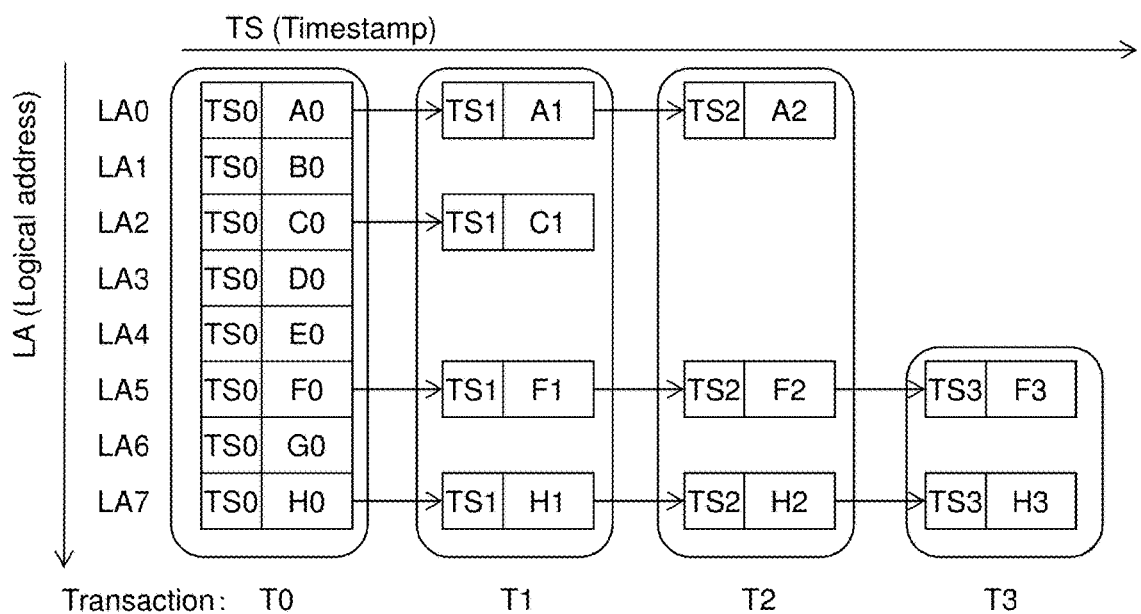
FIG. 3 is a schematic view of an example of a logical image of a write in a append-type MVCC system according to the first embodiment.
Figure 4:
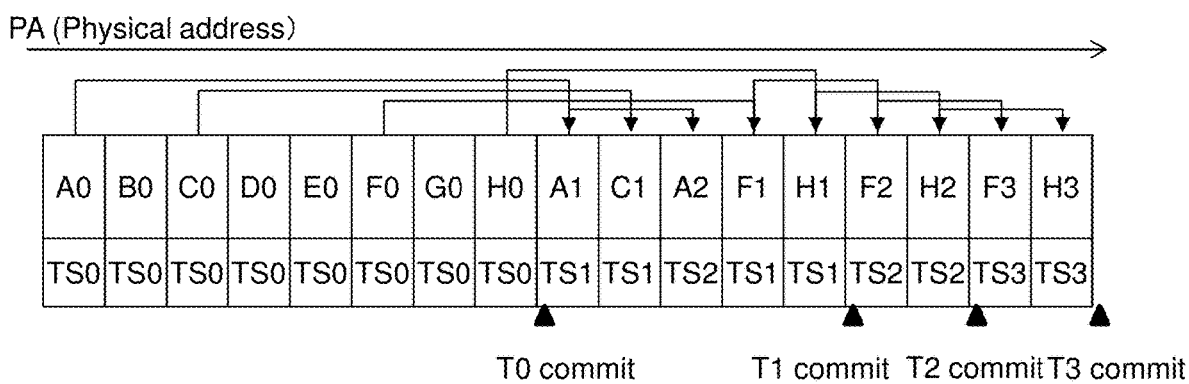
FIG. 4 is a schematic view of an example of a physical image of a write in the append-type MVCC system according to the first embodiment.

FIG. 3 is a schematic view of an example of a logical image of a write in the append-type MVCC system according to the first embodiment. FIG. 4 is a schematic view of an example of a physical image of a write in the append-type MVCC system. FIGS. 3 and 4 correspond to each other. In the following description, a "logical address" and a "physical address" refer to a logical address and a physical address of the FM device 30. In other words, the FM controller 32 (FM control program 442) provides a logical space (logical address space) and accepts an I/O request specifying a logical address with respect to the logical space. When the I/O request is a write request, the FM controller 32 allocates a physical address (a physical address of a free page) to a logical address and writes write target data in a free page to which the allocated physical address belongs.

With the append-type MVCC system according to the present embodiment, since at least free area management is offloaded to the FM device 30, a logical address remains the same before and after rewriting data. In other words, the DBMS 412 (query executing unit 424) need not search for a free area when rewriting data. Specifically, for example, (A) to (D) below are performed.

(A) A timestamp associated with a transaction differs for each transaction.

(B) A logical address at which a write occurs in a transaction is handled as follows. Specifically, a timestamp associated with the transaction is associated with a write destination logical address. When a physical address of any page is not allocated to the write destination logical address, a physical address of a free page is allocated to the write destination logical address and data is written to the free page. On the other hand, when a physical address of a page in which pre-update data is written is allocated to the write destination logical address, a physical address of a free page is allocated to the write destination logical address in place of the already-allocated physical address and post-update data is stored in the free page.

(C) A logical address at which a write does not occur in a transaction is handled as follows. Specifically, when the FM controller 32 receives a read request specifying the logical address and a timestamp associated with the transaction, data associated with a latest timestamp with respect to the logical address is read.

(D) A plurality of transactions may be executed in parallel. Specifically, before a transaction is committed, a write of data to the database may be performed with respect to another transaction.

According to (A) to (D) above, statements (a) to (c) below may be made with reference to FIGS. 3 and 4.

(a) Write targets in a transaction "T0" are data "A0" to "H0". Write destinations of the data "A0" to "H0" are, respectively, logical addresses "LA0" to "LA7". A timestamp "TS0" associated with the transaction "T0" is associated with each of the logical addresses "LA0" to "LA7". The pieces of data "A0" to "H0" are respectively written to eight different pages having consecutive physical addresses. The physical addresses of the eight pages are respectively allocated to the logical addresses "LA0" to "LA7". The data "H0" is written and the transaction "T0" is committed.

(b) Transactions "T1" and "T2" are executed in parallel. Write targets in the transaction "T1" are post-update data "A1", "C1", "F1", and "H1" of the data "A0", "C0", "F0", and "H0", are, and write targets in the transaction "T2" are post-update data "A2", "F2", and "H2" of the data "A1", "F1", and "H1". Write destinations of the data "A1", "C1", "F1", and "H1" are, respectively, logical addresses "LA0", "LA2", "LA5", and "LA7". A timestamp "TS1" associated with the transaction "T1" is associated with each of the logical addresses "LA0", "LA2", "LA5", and "LA7". The pieces of data "A1", "C1", "F1", and "H1" are respectively written to four pages. The physical addresses of the four pages are respectively allocated to the logical addresses "LA0", "LA2", "LA5", and "LA7" in place of the physical addresses already allocated. Between the write of the data "C1" and the write of the data "F1", one piece of write target data "A2" in another transaction "T2" is written with respect to the logical address "LA0". A physical address of a write destination page of the data "A2" is allocated to the logical address "LA0" in place of the physical address of the page storing the data "A1". The data "H1" is written and the transaction "T1" is committed. Write destinations of remaining write target data "F2" and "H2" in the transaction "T2" are, respectively, the logical addresses "LA5" and "LA7". The pieces of data "F2" and "H2" are respectively written to two pages. The physical addresses of the two pages are respectively allocated to the logical addresses "LA5" and "LA7" in place of the physical addresses already allocated. The data "H2" is written and the transaction "T2" is committed.

(c) Write targets in a transaction "T3" are post-update data "F3" and "H3" of the data "F2" and "H2". Write destinations of the data "F3" and "H3" are, respectively, the logical addresses "LA5" and "LA7". A timestamp "TS3" associated with the transaction "T3" is associated with each of the logical addresses "LA5" and "LA7". The pieces of data "F3" and "H3" are respectively written to two pages. The physical addresses of the two pages are respectively allocated to the logical addresses "LA5" and "LA7" in place of the physical addresses already allocated. The data "H3" is written and the transaction "T3" is committed.

According to (a) to (c) described above, for example, the data "A0" is data that is no longer referred to after the transaction "T1" for writing the data "A1" is committed unless the data "A0" is referred to by another transaction. Such data may be deleted.

In consideration thereof, in the present embodiment, the FM device 30 stores the extended logical-to-physical conversion information 451 described above.

Figures 5, 6:
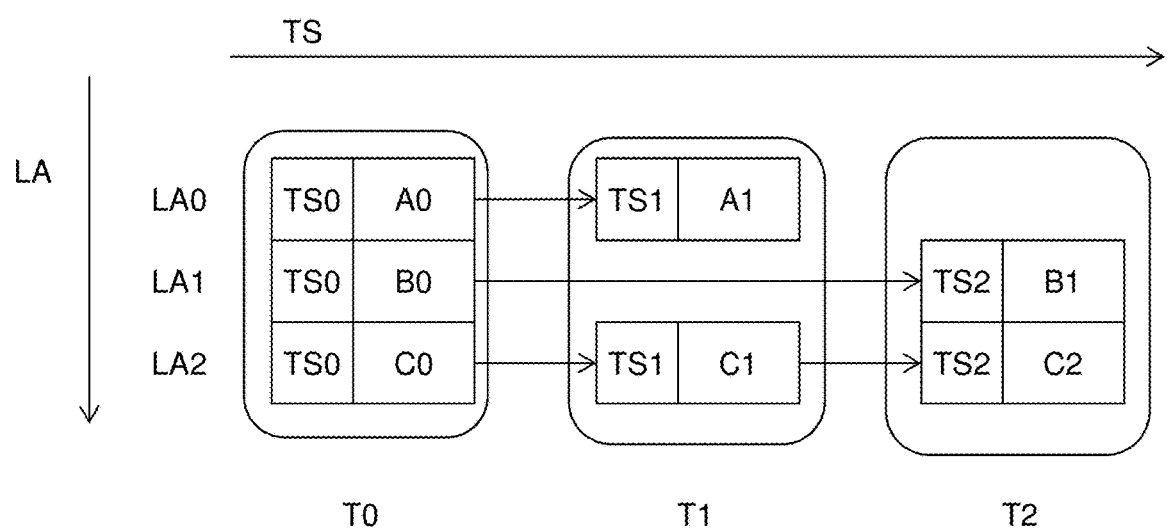
FIG. 5 shows a configuration example of extended logical-to-physical conversion information.
FIG. 6 shows an example of an association among a transaction, a timestamp, a logical address, and data.

FIG. 5 shows a configuration example of the extended logical-to-physical conversion information 451.

The extended logical-to-physical conversion information 451 has, for example, a table structure and is extended address conversion information as described earlier. The extended logical-to-physical conversion information 451 includes a plurality of entries. An entry exists for each LA+TS (a set of a logical address and a timestamp). Information stored in each entry includes LA+TS 501, a PA 502, and a reference counter 503.

LA+TS 501 represents a set of a logical address and a timestamp. The timestamp may be a version ID (for example, a serial number) or a time point. The PA 502 represents a physical address allocated to a logical address. The reference counter 503 is a reference counter representing the number of referring sources (for example, a transaction or a version (timestamp)) that refers to a page to which the physical address belongs. Therefore, the reference counter (value) being equal to or larger than 1 means that data of which a write destination is a logical address associated with the reference counter is referred to by at least one transaction. The reference counter (value) being 0 means that data of which a write destination is a logical address associated with the reference counter is not referred to by any transaction. When the reference counter is "0" and a newer TS than a TS associated with a logical address associated with the reference counter "0" is associated with a same logical address as a logical address associated with the reference counter "0", data of which a write destination is the logical address associated with the reference counter "0" may be handled as data that can be erased (data to be invalidated).

Next, an example of an association among a transaction, a timestamp, a logical address, data, a physical address, a page state (valid/invalid), and a reference counter will be described with reference to FIGS. 6 and 7.

FIG. 6 shows an example of an association among a transaction, a timestamp, a logical address, and data. FIG. 7 shows an example of an association among a timestamp, a logical address, data, a physical address, a page state (valid/invalid), and a reference counter. FIGS. 6 and 7 correspond to each other. Moreover, the description given below is premised on the following.

Notation in FIG. 6 is the same as the notation in FIG. 3.

Figure 7:
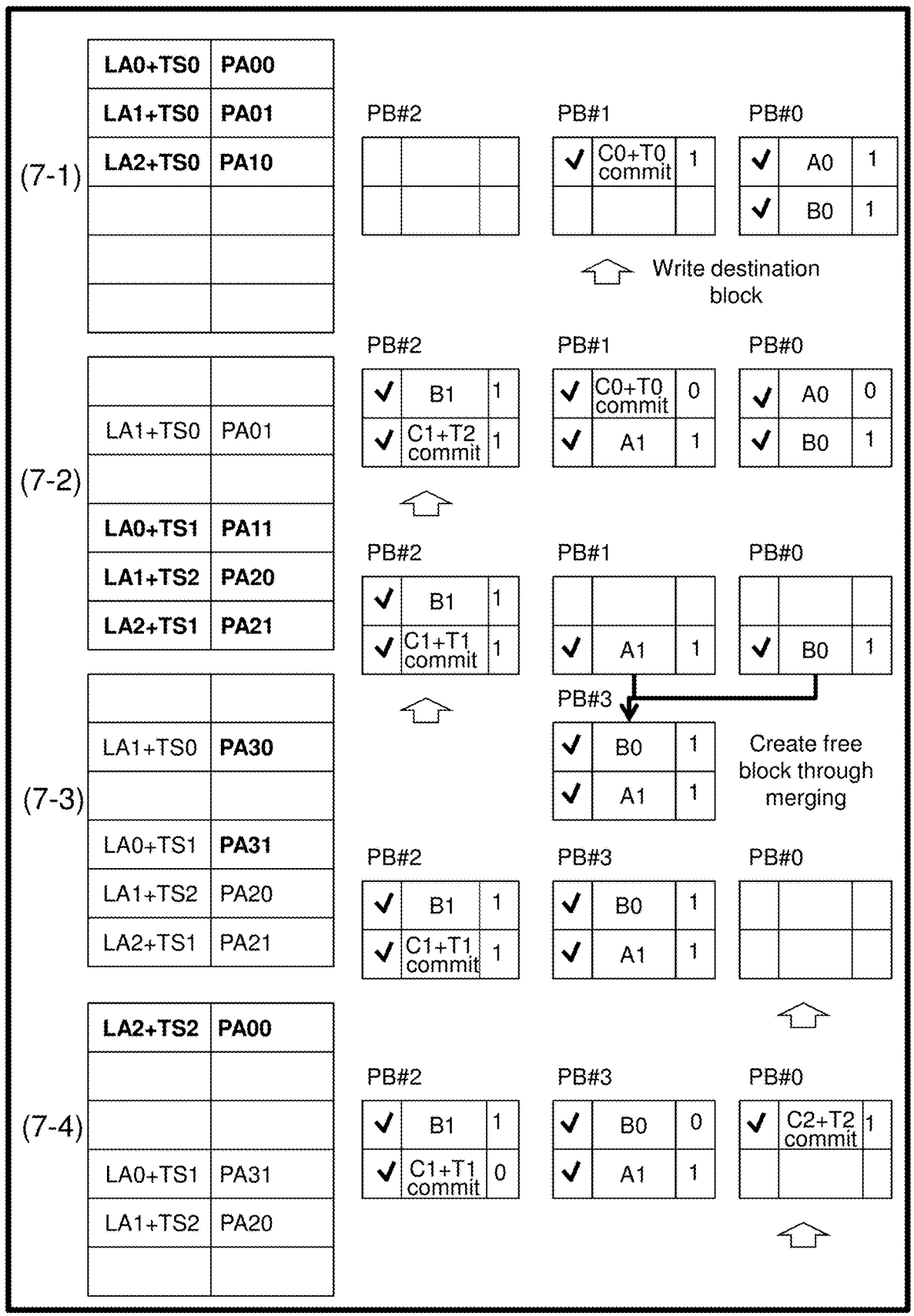
FIG. 7 shows an example of an association among a timestamp, a logical address, data, a physical address, a page state (valid/invalid), and a reference counter.

In FIG. 7, one box constituted by two entries corresponds to one block. Three fields constituting each entry signify, from left to right, a check box field, a data field, and a reference counter field. One entry corresponds to one page. Therefore, in the example shown in FIG. 7, one block is constituted by two pages.

In addition, in FIG. 7, a physical address is a combination of a symbol (P) signifying a physical address, a block number, and a page number. For example, a physical address of an m-th page (physical page) in an n-th block (physical block) can be notated as "Pnm" (where n and m are respectively integers). A page corresponding to the physical address Rnm can be notated as "page #nm". The n-th block can be notated as "PB #n" or "block #n". The m-th page can be notated as "PP #m" or "page #m".

In FIG. 7, a check mark signifies a page of which a reference counter is equal to or larger than "1". Therefore, a check mark covers a valid page (valid data). An absence of a check mark and a presence of data signify an invalid page (invalid data). An absence of a check mark and an absence of data signify a free page.

In FIG. 7, a value in the reference counter field represents a reference counter.

A write destination logical address of data "Ax" (x=0, 1, ...) is a logical address "LA1". A write destination logical address of data "Bx" (x=0, 1, ...) is a logical address "LA2". A write destination logical address of data "Cx" (x=0, 1, ...) is a logical address "LA3".

(7-1) Write targets in a transaction "T0" are data "A0" to "C0". Therefore, as LA+TS, the FM controller 32 registers "LA0+TS0", "LA1+TS0", and "LA2+TS0" in the extended logical-to-physical conversion information 451. When the write destination block is a free block #0 (a block in which every page is in a free state), the FM controller 32 writes the data "A0" and "B0" in pages #0 and #1 of a block #0, changes the write destination block to a free block #1, and writes the remaining data "C0" in a page #10. Therefore, the FM controller 32 respectively allocates physical addresses "PA00", "PA01", and "PA10" to "LA0+TS0", "LA1+TS0", and "LA2+TS0". The three pages respectively belonging to the physical addresses "PA00", "PA01", and "PA10" are valid pages. The FM controller 32 adds 1 to each of the three reference counters respectively associated with "LA0+

TS0", "LA1+TS0", and "LA2+"TS0". As a result, each of the three reference counters becomes "1".

(7-2) When the transaction "T0" is committed by writing of the data "C0", the FM controller 32 subtracts 1 from each of the three reference counters respectively associated with "LA0+TS0", "LA1+TS0", and "LA2+TS0" which are associated with the timestamp "TS0". As a result, each of the three reference counters becomes "0". However, 1 is once again added to each of the three reference counters. This is because the data "A0" and "C0" are pre-update data of the write target data "A1" and "C1" in a transaction "T1" and data "B0" is pre-update data of write target data "B1" in a transaction "T2". Therefore, as LA+TS, the FM controller 32 registers "LA0+TS1", "LA1+TS2", and "LA2+TS1" in the extended logical-to-physical conversion information 451. In addition, the FM controller adds 1 to each of the three reference counters respectively associated with "LA0+TS1", "LA1+TS2", and "LA2+TS1". Furthermore, the FM controller also adds 1 to the reference counter associated with "LA1+TS0" to which belongs pre-update data "B0" associated with "LA1+TS2". As a result, a check mark is associated with each of "LA0+TS1", "LA1+TS2", "LA2+TS1", and "LA2+TS0". The data "A1", "B1", and "C1" are pages #11, #20, and #21. Therefore, the FM controller 32 respectively allocates physical addresses "PA11", "PA20", and "PA21" to "LA0+TS1", "LA1+TS2", and "LA2+TS1". When the transaction "T1" is committed by writing of the data "C1", the FM controller 32 identifies logical addresses "LA0" and "LA2" which are associated with both a timestamp "TS1" associated with the committed transaction "T1" and a latest timestamp among timestamps that are older than the timestamp "TS1". In other words, "LA0+TS0" and "LA2+TS0" are identified. The FM controller 32 subtracts 1 from each of the two reference counters respectively associated with identified "LA0+TS0" and "LA2+TS0". As a result, each of the two reference counters becomes "0".

(7-3) Each of the two reference counters respectively associated with "LA0+TS0" and "LA2+TS0" which are associated with the timestamp "TS0" that is older than the timestamp "TS1" is "0". Therefore, data is no longer referred to with respect to "LA0+TS0" and "LA2+TS0". In consideration thereof, the FM controller 32 handles each of two entries respectively associated with "LA0+TS0" and "LA2+TS0" as an invalid entry (a blank entry in FIG. 7). The FM controller 32 performs a garbage collection process (in other words, a reclamation process) as a wear leveling process. For example, the FM controller 32 respectively copies, from the blocks #0 and #1 with a small amount of migration target data (in other words, the blocks #0 and #1 in which only a small number of pages have a check mark associated therewith), data in a page with which a check mark is associated (data in a page having a reference counter equal to or larger than "1") to a free block #3. Accordingly, the FM controller 32 respectively allocates copy destination physical addresses PA30 and PA31 to "LA0+TS0" and "LA2+TS0" in place of the copy source physical addresses PA00 and PA10. In addition, the FM controller 32 manages each copy source page as an invalid page. As a result, a page associated with an invalidated entry becomes an invalid page. By respectively erasing data from the blocks #0 and #1 without valid pages, the FM controller 32 changes the blocks #0 and #1 into free blocks (FIG. 7 only shows the block #1 among the blocks #1 and #1 becoming a free block). Moreover, according to the wear leveling process, when an update frequency of data in a copy source (migration source) page is relatively high, a copy destination (migration destination) free block may be a block with a relatively small number of erasures. On the other hand, when an update frequency of data in a copy source page is relatively low, a copy destination free block may be a block with a relatively large number of erasures.

(7-4) The FM controller 32 writes remaining data "C2" in the transaction T2 in a free page #0 of the free block #0. Therefore, a physical address "PA00" is allocated to "LA2+TS2". When the transaction "T2" is committed by writing of the data "C2", the FM controller 32 identifies logical addresses "LA1" and "LA2" which are associated with both a timestamp "TS2" associated with the committed transaction "T2" and a last timestamp among timestamps that are older than the timestamp "TS2". In other words, "LA1+TS0" and "LA2+TS1" are identified. The FM controller 32 subtracts 1 from each of the two reference counters respectively associated with identified "LA1+TS0" and "LA2+TS1". As a result, each of the two reference counter becomes "0", and the three reference counters respectively associated with logical addresses "LA0+TS1", "LA1+TS2", and "LA2+TS2" remain "1". The reason why the reference counter associated with each of "LA0+TS1", "LA1+TS2", and "LA2+TS2" (in other words, the reference counter associated with a latest time point with respect to each logical address) is equal to or larger than "1" (instead of being set to "0") is that last data at a time point of a latest timestamp "TS2" may be referred to.

Hereinafter, a read process, a write process, a reference counter update process, and a GC (garbage collection) process performed in the present embodiment will be described with reference to FIGS. 8 to 11. Moreover, in FIGS. 8 to 11, processes associated with the "host" are performed by the host system (the DBMS 412 and the storage controller 842) and processes associated with the "FM" are performed by the FM controller 32.

Figure 8:
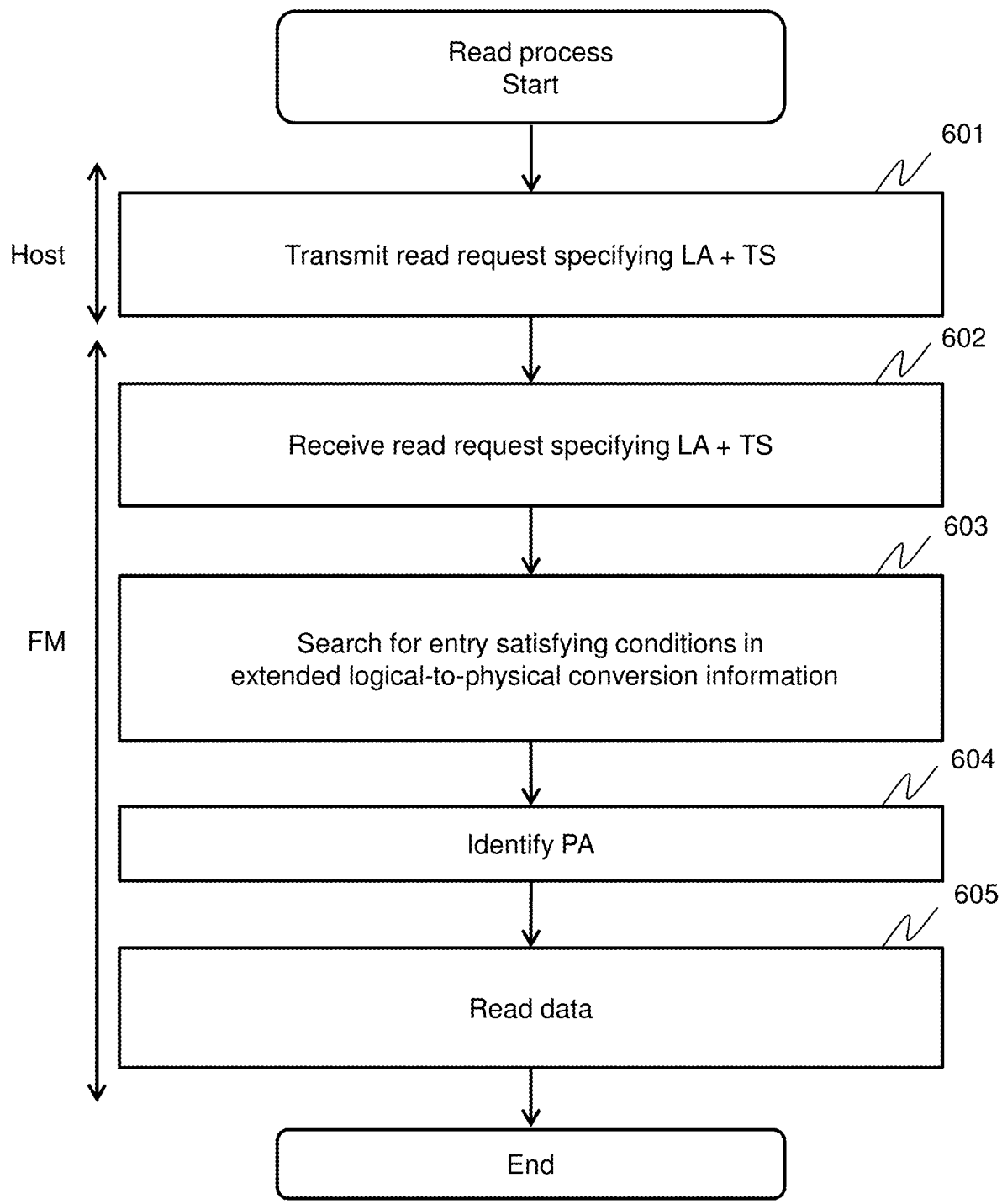
FIG. 8 shows an example of a flow of a read process.

FIG. 8 shows an example of a flow of a read process.

The DBMS 412 (query executing unit 424) issues a read request specifying a read source logical address (LA) and a timestamp (TS) (step 601). The issued read request is sent to the external storage apparatus 402 via the operating system 417. The storage controller 842 transmits a read request specifying the LA and the TS to the FM device 30 associated with the read source logical address in the storage device group 443.

The FM controller 32 (FM control program 442) receives the read request specifying the LA and the TS (step 602). The FM controller 32 searches for, with respect to the specified LA, an entry associated with the specified TS or a last TS among TSs older than the specified TS in the extended logical-to-physical conversion information 451 (step 603).

The FM controller 32 identifies a physical address in the found entry (step 604). The FM controller 32 reads data from a page to which the identified physical address belongs, and transmits the read data to the storage controller 842 as a response to the read request received in step 602 (step 605). The storage controller 842 transmits data based on one or more pieces of data respectively read from one or more FM devices as a response to the read request from the database server 401.

In the read process, the reference counter update process described later is also performed.

Figure 9:
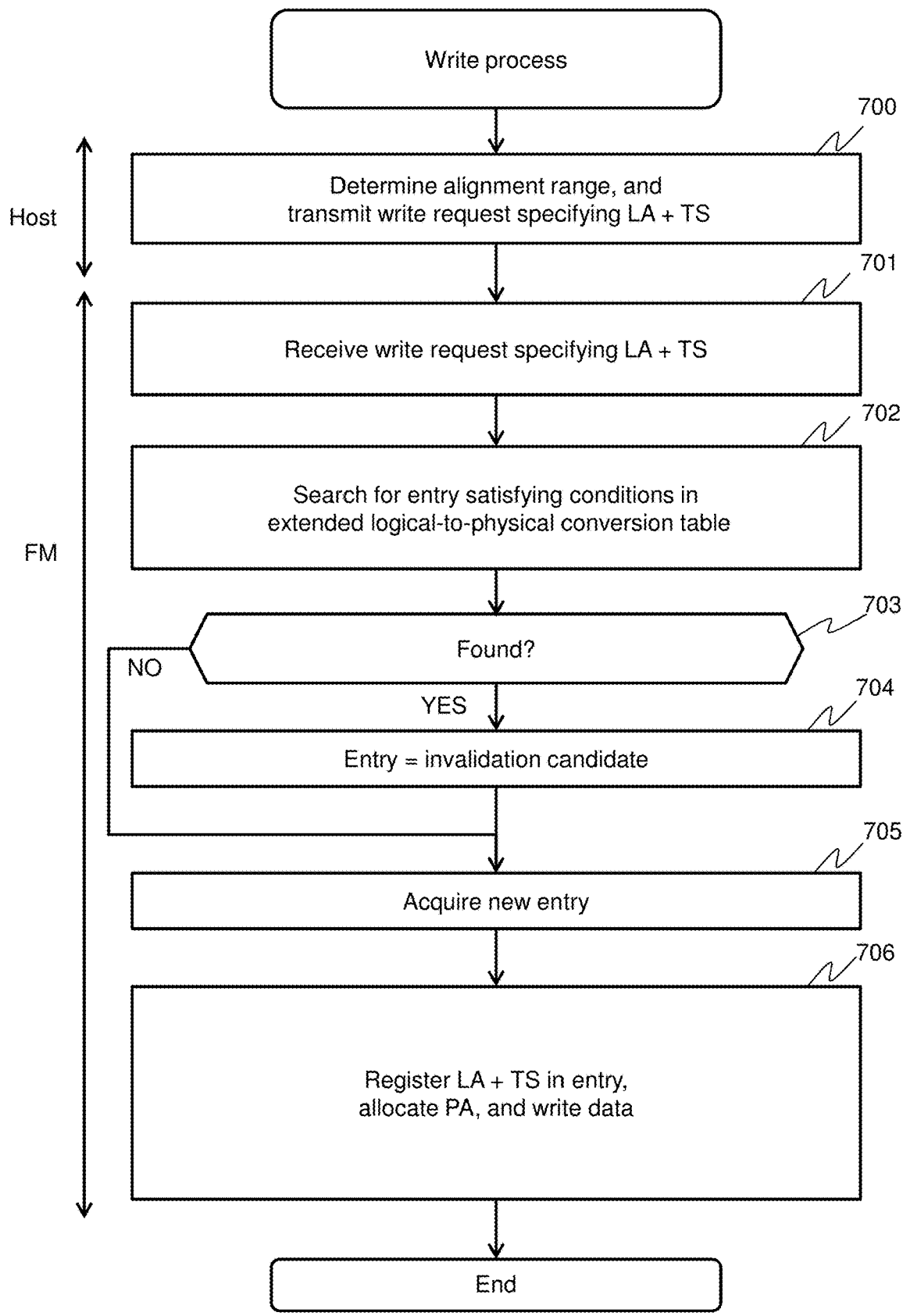
FIG. 9 shows an example of a flow of a write process.

FIG. 9 shows an example of a flow of a write process.

The DBMS 412 (query executing unit 424) determines, as write target data, data of which an amount is an integer multiple of a page size in check point target data stored in a cache area (an area provided on the memory 416). The DBMS 412 issues a write request specifying a write destination logical address (LA) and a timestamp (TS) (step 700). The write request is accompanied with the write target data. Moreover, for example, when an ECC (Error Correcting Code) is added to each page, a "page size" as used herein may be a size excluding the ECC. In addition, when an area unit size (management unit size) in a cache area and a page size are the same, step 700 need not be performed.

The issued write request is transmitted to the external storage apparatus 402 via the operating system 417. The storage controller 842 transmits a write request specifying the LA and the TS to the FM device 30 associated with the write destination logical address in the storage device group 443.

The FM controller 32 (FM control program 442) receives the write request specifying the LA and the TS (step 701). The FM controller 32 searches for, with respect to the specified LA, an entry which is associated with the specified TS or a latest TS among TSs older than the specified TS and of which a reference counter is "0" in the extended logical-to-physical conversion information 451 (step 702).

When such an entry is found (step 703: YES), the FM controller 32 assumes that the found entry is an invalidation candidate (step 704). An "invalidation candidate" means that an invalidation is to be performed at the time of commitment of a transaction. The fact that the found entry is an invalidation candidate is associated with the found entry. For example, the extended logical-to-physical conversion information 451 has a column in which a flag indicating whether or not an entry is an invalidation candidate is registered, and a flag associated with the entry is updated to a value signifying an invalidation candidate. Alternatively, for example, a code signifying that an entry is an invalidation candidate is associated with at least one of the LA+TS 501, the PA 502, and the reference counter 503 associated with the entry.

When such an entry is not found (step 703: NO) or after step 704, the FM controller 32 acquires a new entry with respect to the received write request from the extended logical-to-physical conversion information 451 (step 705). The FM controller 32 performs step 706. In step 706, for example, the FM controller 32 performs the following.

The FM controller 32 registers the LA and the TS specified in the write request in the acquired entry.

The FM controller 32 reserves a free page and allocates a physical address (PA) of the free page to the LA and the TS specified in the write request. In other words, the FM controller 32 registers the PA of the reserved free page in the acquired entry.

The FM controller 32 writes data accompanying the write request to the reserved free page (the allocated free page).

In the write process, the reference counter update process described later is also performed.

Figure 10:
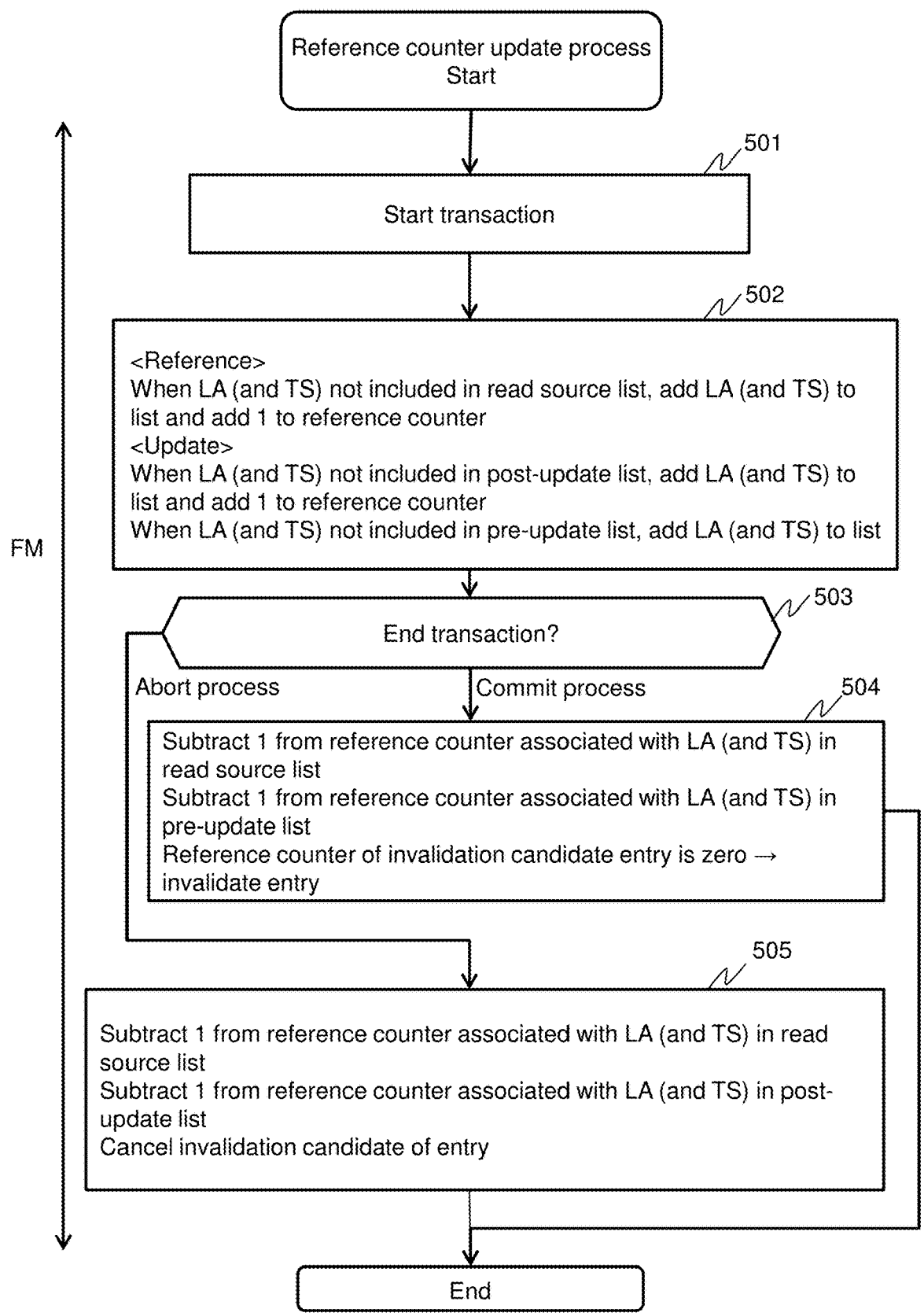
FIG. 10 shows an example of a flow of a reference counter update process.

FIG. 10 shows an example of a flow of the reference counter update process.

At least one of one or more read processes (FIG. 8) and one or more write processes (FIG. 9) are performed in the processing of one transaction. The FM controller 32 detects a start of a transaction (step 501). The detection of the start of a transaction may be performed by, for example, the FM controller 32 receiving a request (BEGIN) signifying the start of a transaction from the DBMS 412 via the storage controller 842.

Step 502 is performed during a period between the detection of the start of a transaction to a detection of an end of the transaction. Specifically, when the FM controller 32 receives a read request, the FM controller 32 adds an LA (and a TS) specified in the read request to a list of read source variables (for example, ReadSet used when managing a cache area) if the LA (and the TS) are not yet included in the list, and adds 1 to a reference counter associated with the LA and the TS. On the other hand, when the FM controller 32 receives a write request, the FM controller 32 adds an LA (and a TS) specified in the write request to a list of post-update variables (for example, WriteNewSet used when managing a cache area) if the LA (and the TS) are not yet included in the list, and adds 1 to a reference counter associated with the LA and the TS. When pre-update data of data in accordance with the write request exists, the FM controller 32 adds an LA (and a TS) specified in the write request to a list of pre-update variables (for example, WriteOldSet used when managing a cache area) if the LA (and the TS) are not yet included in the list. Step 502 is performed every time a read request or a write request is received.

The FM controller 32 detects an end of the transaction (step 503). The detection of the end of a transaction may be performed by, for example, the FM controller 32 receiving a request (COMMIT) signifying the end of a transaction from the DBMS 412 via the storage controller 842. When this detection is made, a commit process is performed. Meanwhile, for example, a detection of a prescribed error during processing of a transaction may constitute a detection of an end of the transaction. When this detection is made, an abort process is performed.

In a commit process, the FM controller 32 performs step 504. Specifically, the FM controller 32 subtracts 1 from a reference counter associated with the LA and the TS included in the read source variable list associated with the transaction. In addition, the FM controller 32 subtracts 1 from a reference counter associated with the LA and the TS included in the pre-update variable list associated with the transaction. Accordingly, the reference counter associated with the LA and the TS included in the read source variable list associated with the transaction is returned to a value prior to the start of the transaction. Furthermore, the reference counter associated with the LA and the TS included in the pre-update variable list associated with the transaction may become zero. The FM controller 32 invalidates the invalidation candidate entry of which a reference counter has become zero (the entry having been made an invalidation candidate in step 704 shown in FIG. 9). Accordingly, a page associated with a PA registered in the entry is handled as an invalid page. Moreover, the FM controller 32 does not subtract 1 from a reference counter associated with the LA and the TS included in the post-update variable list associated with the transaction. This is because data associated with the LA and the TS included in the post-update variable list (latest data at the time of commit) is data that may be referred to and, therefore, the reference counter may be kept at a value equal to or larger than 1.

On the other hand, in an abort process, the FM controller 32 performs step 505. Specifically, the FM controller 32 subtracts 1 from a reference counter associated with the LA and the TS included in the read source variable list associated with the transaction. In addition, the FM controller 32 subtracts 1 from a reference counter associated with the LA and the TS included in the post-update variable list associated with the transaction. Accordingly, the reference counters associated with the LA and the TS included in the read source variable list, the pre-update variable list, and the post-update variable list that are associated with the transaction are returned to a value prior to the start of the transaction. Moreover, the FM controller 32 may make the entry having been made an invalidation candidate in this transaction no longer an invalidation candidate (may cancel the invalidation candidate state).

Figure 11:
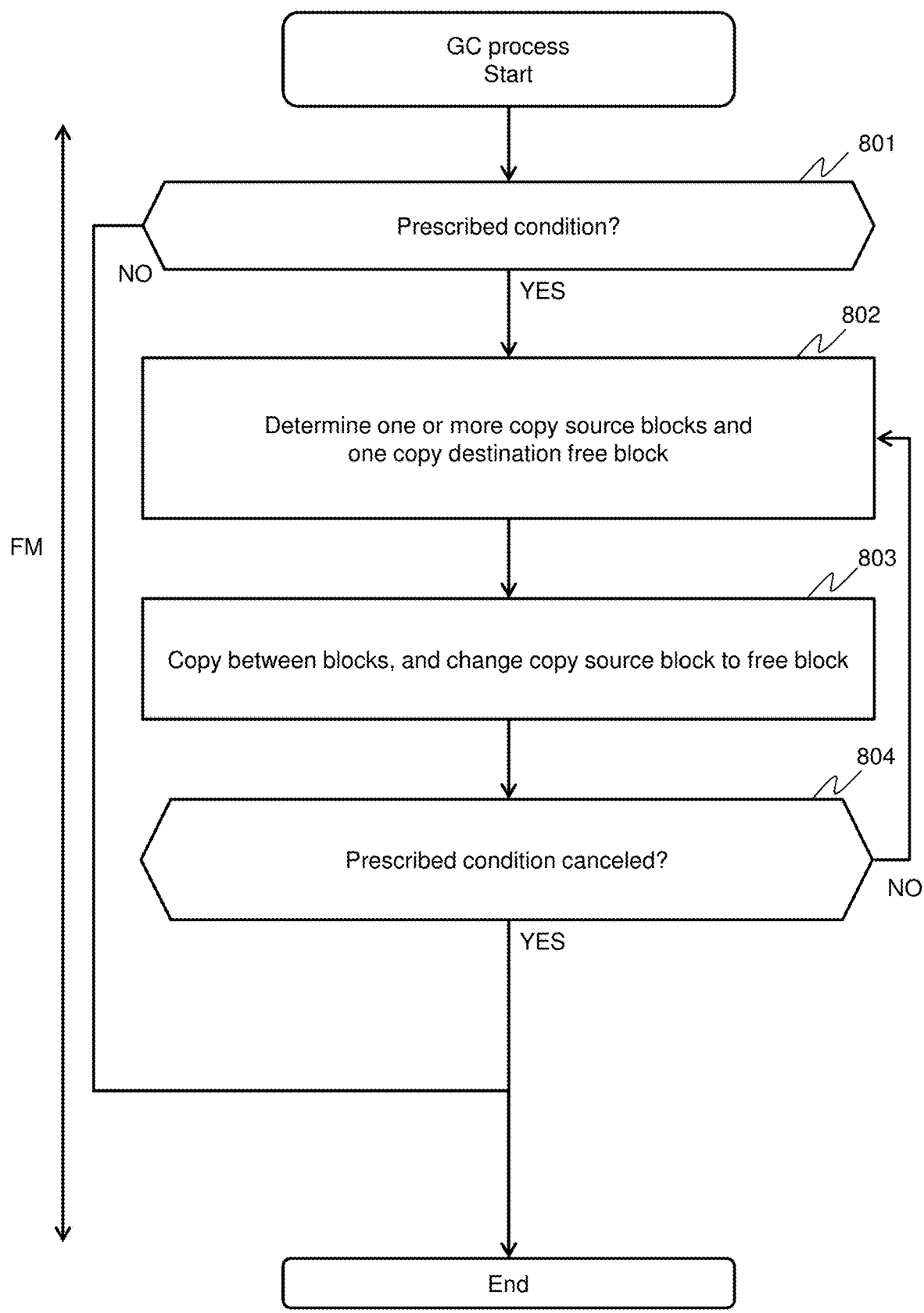
FIG. 11 shows an example of a flow of a GC (garbage collection) process.

FIG. 11 shows an example of a flow of a GC process.

The FM controller 32 determines whether or not a prescribed condition is satisfied (step 801). The prescribed condition is, for example, a ratio of free blocks to the total number of blocks falling below a prescribed value.

When the prescribed condition is satisfied (step 801: YES), the FM controller 32 selects one or more copy source blocks and one copy destination free block (step 802). A copy source block is, for example, a block with a relatively small number of valid pages (a block with a small amount of copy target data). For example, when update frequency of copy target data in a copy source block is relatively high, a copy destination block is a block with a relatively small number of erasures. On the other hand, for example, when update frequency of copy target data in a copy source block is relatively low, a copy destination block is a block with a relatively large number of erasures.

The FM controller 32 performs step 803. Specifically, the FM controller 32 copies valid data from one or more copy source blocks to one copy destination free block. Accordingly, every copy source block becomes a block in which a valid page does not exist. The FM controller 32 performs an erase process on each copy source block to make each copy source block a free block.

When the state in which the prescribed condition is satisfied is canceled (step 804: YES), the FM controller 32 ends the process. On the other hand, when the state in which the prescribed condition is satisfied is not canceled (for example, when a ratio of free blocks remains equal to or larger than a prescribed value) (step 804: NO), the FM controller 32 performs step 802.

This concludes the description of the first embodiment. According to the first embodiment, at least free area management among version management and free area management in accordance with a append-type MVCC system is offloaded to the FM device 30. As a result, a load on the processor 414 executing the DBMS 412 is reduced.

Second Embodiment

A second embodiment will now be described. In doing so, differences from the first embodiment will be mainly described and descriptions of points in common with the first embodiment will be either omitted or simplified.

Figure 12:
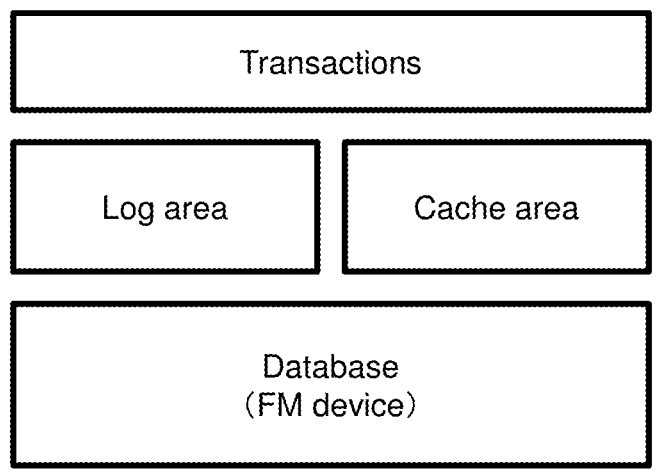
FIG. 12 is a schematic view of an example of log storage according to the first embodiment.

In the first embodiment, as shown in FIG. 12, a log area is separately reserved in a nonvolatile storage device such as the storage device 415. For this reason, there is no need to store a log of the database 451 in the FM device 30. Therefore, a unit size of data in the database 451 (a unit size of data to be written) can be set the same as a size of a page of an FM. As a result, a free area is not created on a page. In other words, data storage efficiency is high.

Figure 13:
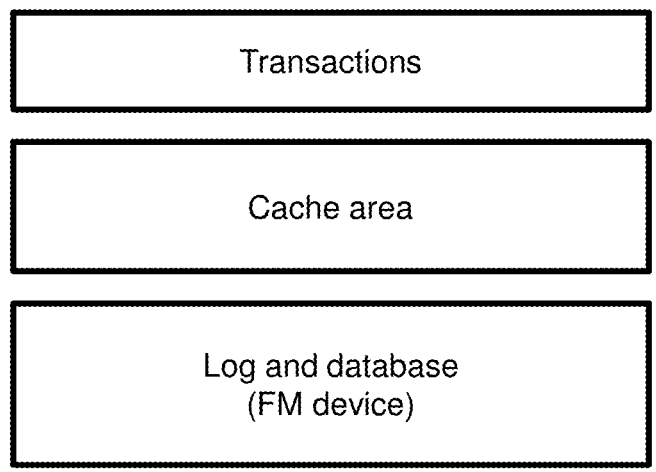
FIG. 13 is a schematic view of an example of log storage according to a second embodiment.

On the other hand, in the second embodiment, as shown in FIG. 13, a log area is not separately reserved. For this reason, a log of the database 451 (a pre-update image including pre-update data on the cache area) and post-update data must be stored in the FM device 30. Therefore, it is difficult to set a unit size of data to be written to a same size as a page of an FM. As a result, a free area may be created on a page. In other words, data storage efficiency may be low.

In consideration thereof, in the second embodiment, a data storage system is varied in accordance with a load on the processor 414.

Figure 14:
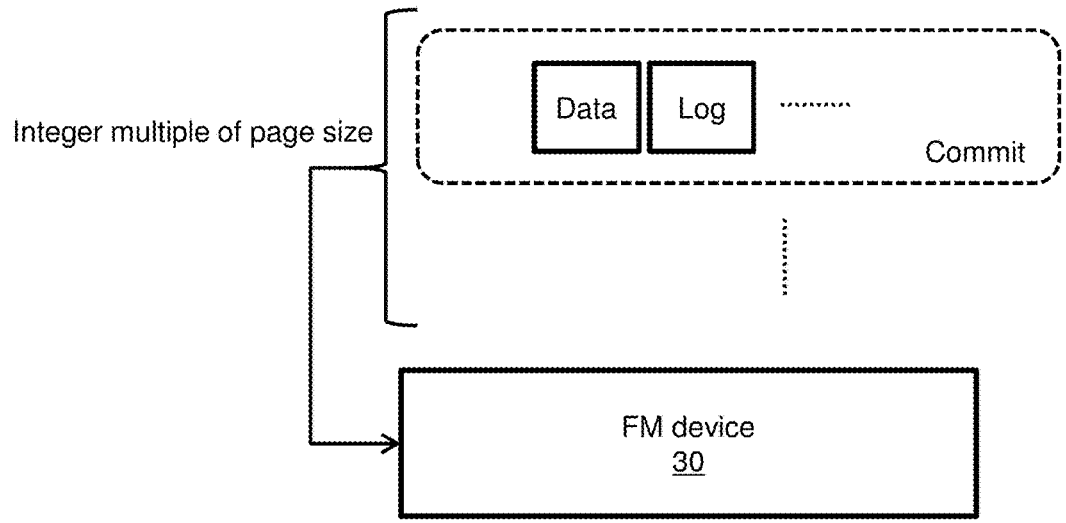
FIG. 14 is a schematic view of a data storage system that is adopted when processor load is high in the second embodiment.

For example, when a load on the processor 414 is higher than a prescribed value, as shown in FIG. 14, the DBMS 412 (query executing unit 424) sets a write unit size to an integer multiple of the page size by grouping the commit process. Specifically, the DBMS 412 waits until data and logs (committed data and logs) corresponding to an integer multiple of the page size are accumulated in the cache area. Since a high load on the processor 414 means that the processor 414 is performing a process other than a write to the FM device 30, an impact of waiting for writes to the FM device 30 is small. When data and logs (committed data and logs) of an amount that is an integer multiple of the page size is accumulated in a cache area, the processor 414 writes the data and the logs to the FM device 30 (external storage apparatus 402). In other words, a write request which specifies data and logs of an amount that is an integer multiple of the page size as a write target is transmitted to the FM device 30. In this manner, when a write unit size is an integer multiple of the page size, a necessity of inter-page merge/copy to be described later can be reduced.

Figure 15:
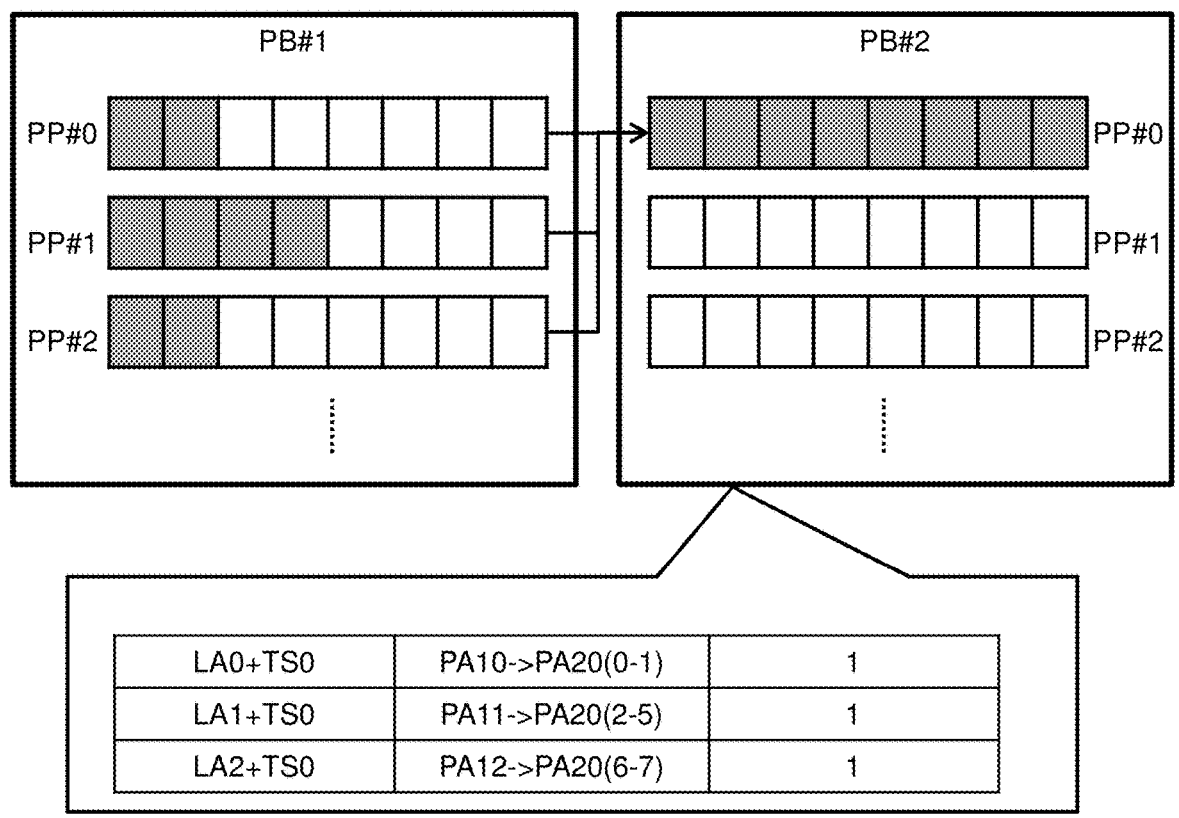
FIG. 15 is a schematic view of a data storage system that is adopted when processor load is low in the second embodiment.

On the other hand, when the load on the processor 414 is equal to or lower than a prescribed value, as shown in FIG. 15, the DBMS 412 (query executing unit 424) does not wait until data and logs (committed data and logs) corresponding to an integer multiple of the page size are accumulated (in FIG. 15, "PB" denotes a block (physical block) and "PP" denotes a page (physical page)). The processor 414 writes data and logs (committed data and logs) under an integer multiple of the page size to the FM device 30 (external storage apparatus 402). According to the example shown in FIG. 15, the write destination block is a block #1. In addition, according to the example shown in FIG. 15, for the sake of brevity, data or a log smaller than a page size is written in each of three pages respectively associated with PA10, PA11, and PA12 (gray cells in the pages denote sectors storing valid data). According to this example, since a free area (free sector) is created in all of the three pages, data storage efficiency is low. The FM controller 32 detects a page with a free sector. In this case, the FM controller 32 detects the three pages respectively associated with PA10, PA11, and PA12. The FM controller 32 aggregates data in the three detected pages into one page. In other words, the FM controller 32 performs inter-page merge/copy. In inter-page merge/copy, a reference counter associated with an LA and a TS of an allocation destination of a copy source page is equal to or larger than "1". This is because, if the reference counter is "0", the copy source page is an invalid page. According to the example shown in FIG. 15, the FM controller 32 aggregates (copies) valid data from the three pages respectively associated with PA10, PA11, and PA12 to a page of PA20 (a page #0 in a block #2). As a result, data storage efficiency is improved. Moreover, the FM controller 32 manages each copy source page as an invalid page. In addition, as shown in FIG. 15, the FM controller 32 respectively associates, with three different LAs respectively associated with PA10, PA11, and PA12, same PA20 in place of PA10, PA11, and PA12 in the extended logical-to-physical conversion information. Moreover, in order to enable association between the LAs and data to be discriminated, the FM controller 32 may associate a sector number with a PA to be associated with an LA. The example shown in FIG. 15 indicates that, in the page of PA20, 0th and 1st sectors are associated with LA0, 2nd to 5th sectors are associated with LA1, and 6th and 7th sectors are associated with LA2.

While several embodiments have been described above, it is to be understood that the described embodiments merely represent examples for illustrating the present invention and that the scope of the present invention is not limited to the embodiments. The present invention can be implemented in various other modes. For example, a part of a database may be stored in one or more FM devices and a remainder of the database may be stored in the memory 416 or the storage device 415.

REFERENCE SIGNS LIST

30 Flash memory (FM) device
401 Database server
412 Database management system (DBMS)

The invention claimed is:

1. A computer system, comprising:
a blockwise-erase nonvolatile storage device which includes a nonvolatile storage medium including a plurality of physical areas and is configured to provide a logical space storing at least a portion of a database; and
a host system including a database management system, wherein
the host system is configured to, when an update of data in the database occurs between a start and an end of a transaction, transmit a write request specifying a first logical address, of a plurality of logical addresses, belonging to an area, in which pre-update data is stored, and a first timestamp associated with the first logical address, of a plurality of timestamps, to the blockwise-erase nonvolatile storage device,
the blockwise-erase nonvolatile storage device includes extended logical-to-physical conversion information, which is information including a plurality of sets of information, each set of information includes a combination of a respective logical address of the plurality of logical addresses and a respective timestamp of the plurality of time stamps, and each set of information is respectively associated with a physical address of a plurality of physical addresses and a reference counter, which indicates a number of sources that refer to the respectively associated set of information,
the blockwise-erase nonvolatile storage device is configured to manage, as a nonerasable physical area, of the plurality of physical areas, a new physical area at a physical address newly allocated to a logical address of the plurality of logical addresses, and
with respect to a target logical address, the blockwise-erase nonvolatile storage device is configured to:
(A) on the basis of the extended logical-to-physical conversion information, determine whether there is a second timestamp associated with the target logical address that is older than a latest timestamp, and whether a respective reference counter associated with the set of information including the target logical address and the second timestamp indicates that there is no referring source; and
(B) when a result of the determination of (A) is affirmative, manage as an erasable physical area, of the plurality of physical areas, a physical address associated with the set of information that includes both the target logical address and the second timestamp.

2. The computer system according to claim 1, wherein the blockwise-erase nonvolatile storage device is configured to execute (B) when a result of the determination of (A) is affirmative and the transaction has ended by a commitment of the transaction.

3. The computer system according to claim 2, wherein the blockwise-erase nonvolatile storage device is configured to execute (A) and (B) with respect to the write request received between the start and the end of the transaction,
the target logical address is the first logical address specified in the received write request, and
the latest timestamp is the first timestamp specified in the received write request.

4. The computer system according to claim 3, wherein the blockwise-erase nonvolatile storage device is configured to add, between the start and the commitment of the transaction, a value to a reference counter associated with the first logical address and the first timestamp specified in the received write request, and
the blockwise-erase nonvolatile storage device is configured to, in a case of the commitment of transaction, subtract a value from a reference counter associated with the target logical address and the second timestamp and execute (A).

5. The computer system according to claim 1, further comprising
a log storage device that is a nonvolatile storage device having a log area in which a log of the database is stored, wherein
a unit size of data written to the nonvolatile storage device is an integer multiple of a physical area size.

6. The computer system according to claim 1, wherein the host system is configured to write a log of the database, in addition to data of the database, in the blockwise-erase nonvolatile storage device, and
the nonvolatile storage device is configured to:
select two or more physical areas, which are to serve as copy sources respectively, and one free physical area, which is to serve as a copy destination;
copy data in the two or more copy source physical areas to the one copy destination physical area; and
allocate a physical address of the copy destination physical area to a logical address and a timestamp associated with each of the two or more copy source physical areas.

7. The computer system according to claim 6, wherein the host system is configured to, when a load on the host system is high, transmit a request of writing data and logs of an amount that is an integer multiple of a physical area size to the blockwise-erase nonvolatile storage device.

8. The computer system according to claim 1, wherein the host system is configured to transmit a read request specifying a third logical address, of the plurality of logical addresses, and a third timestamp, of the plurality of timestamps, to the blockwise-erase nonvolatile storage device, and
the blockwise-erase nonvolatile storage device is configured to:
receive the read request;
based on the extended logical-to-physical conversion information, with respect to the logical address specified in the read request, identify a physical address, of the plurality of physical addresses, allocated to the timestamp specified in the read request or a latest timestamp among timestamps that are older than the specified timestamp;
read data from a physical area at the identified physical address; and
transmit the read data to the host system.

9. The computer system according to claim 1, wherein
the nonvolatile storage medium is a NAND flash memory including a plurality of blocks,
each of the blocks includes a plurality of pages, and
each physical area is a page.

10. A database management method, comprising:
providing, with the use of a blockwise-erase nonvolatile storage device having a nonvolatile storage medium including a plurality of physical areas, a logical space by a host system including a database management system;
storing at least a portion of a database in the logical space;
receiving, when an update of data in the database occurs between a start and an end of a transaction, a write request specifying a first logical address, of a plurality of logical addresses, belonging to an area, in which pre-update data is stored, and a first timestamp associated with the first logical address, of a plurality of timestamps, by the blockwise-erase nonvolatile storage device from the host system;
updating, by the blockwise-erase nonvolatile storage device, based on the first logical address and the first timestamp specified in the received write request, extended logical-to-physical conversion information, which is information including a plurality of sets of information, each set of information includes a combination of a respective logical address of the plurality of logical addresses and a respective timestamp of the plurality of time stamps, and each set of information is respectively associated with a physical address of a plurality of physical addresses and a reference counter, which indicates a number of sources that refer to the respectively associated set of information;
determining, on the basis of the extended logical-to-physical conversion information, with respect to a target logical address, by the blockwise-erase nonvolatile storage device, whether there is a second timestamp associated with the target logical address that is older than a last timestamp and whether a respective reference counter associated with both the set of information including the target logical address and the second timestamp indicates that there is no referring source; and
managing, when a result of the determination is affirmative, by the blockwise-erase nonvolatile storage device, a physical area of the plurality of physical areas at a physical address associated with the set of information including the target logical address and the second timestamp as an erasable physical area.

11. A nonvolatile storage device, comprising:
a nonvolatile storage medium including a plurality of physical areas; and
a medium controller configured to provide a logical space storing at least a portion of a database to a host system including a database management system, wherein
the host system is configured to, when an update of data in the database occurs between a start and an end of a transaction, transmit a write request specifying a first logical address, of a plurality of logical addresses, belonging to an area, in which pre-update data is stored, and a first timestamp associated with the first logical address, of the plurality of timestamps, to the blockwise-erase nonvolatile storage device,
the medium controller includes extended logical-to-physical conversion information, which is address conversion information including a plurality of sets of information, each set of information includes a combination of a respective logical address of the plurality of logical addresses and a respective timestamp of the plurality of time stamps, and each set of information is respectively associated with a physical address of a plurality of physical addresses and a reference counter, which indicates a number of sources that refer to the respectively associated set of information,
the medium controller is configured to manage, as a nonerasable physical area, of the plurality of physical areas, a new physical area at a physical address newly allocated to a logical address of the plurality of logical addresses, and
with respect to a target logical address, the medium controller is configured to:
(A) on the basis of the extended logical-to-physical conversion information, determine whether there is a second timestamp associated with the target address that is older than a last timestamp, and whether a respective reference counter associated with the set of information including the target logical address and the second timestamp indicates that there is no referring source; and
(B) when a result of the determination of (A) is affirmative, manage as an erasable physical area, of the plurality of physical areas, at a physical address associated with the set of information that includes the target logical address and the second timestamp.

* * * * *